(12) United States Patent
Peng et al.

(10) Patent No.: US 8,355,446 B2
(45) Date of Patent: Jan. 15, 2013

(54) TEMPORAL VECTOR PROCESSING DEVICE AND METHOD FOR MOTION ESTIMATION

(75) Inventors: Yuan-Chih Peng, Jhubei (TW); Yen-Lin Chen, Sindian (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 404 days.

(21) Appl. No.: 12/654,014

(22) Filed: Dec. 8, 2009

(65) Prior Publication Data

US 2010/0283900 A1    Nov. 11, 2010

(30) Foreign Application Priority Data

May 11, 2009    (TW) ................................ 98115491 A

(51) Int. Cl.
*H04N 5/14*    (2006.01)
(52) U.S. Cl. .................................... 375/240.16; 348/699
(58) Field of Classification Search .................... None
See application file for complete search history.

(56) References Cited

U.S. PATENT DOCUMENTS

| | | | |
|---|---|---|---|
| 7,295,614 B1 * | 11/2007 | Shen et al. | 375/240.25 |
| 2005/0259739 A1 * | 11/2005 | Nakamura et al. | 375/240.16 |
| 2008/0123747 A1 * | 5/2008 | Lee et al. | 375/240.16 |

* cited by examiner

*Primary Examiner* — Sath V Perungavoor
*Assistant Examiner* — Mohammed Jebari
(74) *Attorney, Agent, or Firm* — Bacon & Thomas, PLLC

(57) ABSTRACT

A temporal vector processing device includes a motion vector estimation device for performing a motion estimation on a first pixel to generate a first motion vector. A motion vector compensation device performs a motion vector compensation on the first pixel based on the first motion vector to obtain a second pixel. A buffer temporarily stores motion vectors of the pixels of the image. A motion vector determination device determines whether a second motion vector is stored in the buffer at a corresponding storage location of the second pixel. In determining that the second motion vector is stored in the buffer at the corresponding storage location of the second pixel, the corresponding storage location of the second pixel in the buffer is updated based on a determination mechanism, and otherwise the first motion vector is directly stored in the buffer at the corresponding storage location of the second pixel.

4 Claims, 9 Drawing Sheets

TEMPORAL VECTOR PROCESSING DEVICE AND METHOD FOR MOTION ESTIMATION

BACKGROUND OF THE INVENTION

1. Field of the Invention

The present invention relates to the technical field of image processing and, more particularly, to a temporal vector processing device and method for reducing a film judder on motion estimation.

2. Description of Related Art

An advanced television signal processing typically includes motion estimation and compensation applied to a frame rate conversion to thereby increase the effective frame rate of a temporal signal and further reduce motion judder or blur. The motion judder generally occurs in a video signal of a film or in display on a large screen. The motion blur typically originates in an LCD display technique. The article "True-Motion estimation with 3-D recursive search block matching", IEEE transactions on circuits and systems for video technology, Vol. 3, No. 5, October 1993, has been proposed to select the spatial and temporal candidate vectors and perform a spatially and temporally recursive processing on the selected candidate vectors to thereby speed up the convergence to the true motion vector under fewer operations or lower computational amount. How a preferred candidate vector is selected can determine the accuracy of the final motion vector. Typically, a spatial consistency and a temporal correlation are considered on selecting a candidate vector. The spatial consistency is based on an assumption that an object is a rigid body and has a certain space, and the temporal correlation is based on an assumption that the object presents a uniform motion. When a correct motion vector occurs in the candidate vectors, a motion vector can gain a higher opportunity on converging to the correct motion vector, and instead an error candidate vector can interfere a motion estimation to increase the opportunity of obtaining an error motion vector. FIG. 1 is a schematic diagram of typical spatial and temporal motion vectors. As shown in FIG. 1, a motion estimation and a motion compensation are performed on a pixel (i, j), where the spatial candidate vectors SMV0, SMV1, SMV2 and the temporal candidate vector TMV are used to achieve the purpose of speeding up a convergence to the true motion vector.

FIG. 2 is a schematic graph of a temporal motion vector generation in the prior art. If a motion estimation is performed between the time Tn−1 and Tn, and the position of the motion vector MVn−1 corresponds to the time Tn−1, a pixel P(i) at Tn−1 has a motion vector MVn−1(i) that can have a future movement to the point corresponding to a pixel P(i+MVn−1) at Tn. However, the motion vector MVn−1(i) of the pixel P(i) is stored in the storage location of the pixel P(i).

When the motion vector MVn between Tn and Tn+1 is calculated, the temporal motion vector of the pixel (i) (solid block) at Tn is related with a pixel (i−3) at Tn−1. Namely, when an object is being moved at a constant speed, the temporal motion vector of the pixel (i) at Tn is the speed of the pixel (i) at Tn. That is, the temporal motion vector of the pixel (i) at Tn is obtained by adding the point of the pixel P(i−3) at Tn−1 and the vector MVn−1 of the pixel P(i−3) and moving the added to the position of the pixel P(i) at Tn. In this case, the vector MVn−1 indicates the temporal motion vector of the pixel (i) at Tn. If a motion vector range locates from −5 to +5, the pixels from the position of a pixel P(i−5) to the position of a pixel P(i+5) and the motion vector MVn−1 at Tn−1 possibly move to the pixel P(i) at Tn. When the object is covered, two or more motion vectors corresponding to the pixel P(i) at passing through Tn may be found in the range. When the object is uncovered, no motion vector corresponding to the pixel P(i) at passing through Tn may be seen in the range. In the prior art, the motion vector MVn−1(i) of the pixel P(i) at Tn−1 is stored in the storage location of the pixel (i), so that the motion vector MVn−1(i) is outputted at Tn, and accordingly the range is searched to thus generate the temporal motion vector. When the motion vector range increases, the computation of searching the range relatively increases, so that the computational amount is too large to meet the practical requirement.

Therefore, it is desirable to provide an improved processing device and method to mitigate and/or obviate the aforementioned problems.

SUMMARY OF THE INVENTION

The object of the present invention is to provide a temporal vector processing device and method for motion estimation, which can adjust temporal vectors to allow a motion vector estimation device to find a correct motion vector more rapidly and accurately.

According to a feature of the invention, a temporal vector processing device for motion estimation is provided, which adjusts a temporal vector corresponding to a pixel of an image consisted of a 2D array of pixels. The processing device includes a motion vector estimation device, a motion vector compensation device, a buffer and a motion vector determination device. The motion vector estimation device reads a first pixel from the image for a motion estimation to thereby generate a first motion vector. The motion vector compensation device is connected to the motion vector estimation device in order to perform a motion vector compensation on the first pixel based on the first motion vector to thereby generate a second pixel. The buffer is connected to the motion vector compensation device in order to store motion vectors of the pixels of the image. The motion vector determination device is connected to the motion vector estimation device, the motion vector compensation device and the buffer in order to determine whether a corresponding storage location of the second pixel in the buffer stores a second motion vector. When it is determined that the second motion vector is stored in the buffer, the second motion vector stored in the buffer at the corresponding storage location of the second pixel is updated based on a determination mechanism, and otherwise the first motion vector is directly stored in the buffer at the corresponding storage location of the second pixel.

The processing device further includes a frame buffer connected to the buffer in order to temporarily store the motion vectors of the buffer.

The frame buffer stores the motion vector stored in the buffer at the corresponding storage location of the second pixel when the motion vector is no more updated. The motion vector compensation device performs a displacement on the first pixel to thereby generate the second pixel, where a displacement quantity is equal to the first motion vector.

According to an embodiment, the motion vector determination device includes:

a first subtractor which subtracts the first motion vector from a global motion vector to thereby generate a first difference;

a second subtractor which subtracts the second motion vector from the global motion vector to thereby generate a second difference;

a first absolute value generator which is connected to the first subtractor in order to perform an absolute operation on the first difference to thereby generate a first difference absolute value;

a second absolute value generator which is connected to the second subtractor in order to perform an absolute operation on the second difference to thereby generate a second difference absolute value;

a first comparator which is connected to the first and the second absolute value generators in order to compare the first and the second difference absolute values, wherein a first comparison signal is generated at a high voltage when the first difference absolute value is greater than the second difference absolute value, and otherwise at a low voltage; and a first multiplexer which is connected to the first comparator in order to receive the first and the second motion vectors, wherein the first motion vector is outputted when the first comparison signal is at the high voltage and conversely the second motion vector is outputted.

According to an alternative, the motion vector determination device is modified to include:

a third subtractor which subtracts the first motion vector from the second motion vector to thereby generate a third difference;

a third absolute value generator which is connected to the third subtractor in order to perform an absolute operation on the third difference to thereby generate a third difference absolute value;

a second comparator which is connected to the third absolute value generator in order to generate a second comparison signal at a low voltage when the third difference absolute value is smaller than a threshold and generate the second comparison signal at a high voltage when the third difference absolute value is greater than or equal to the threshold;

a minimum generator which receives the first and the second motion vectors and outputs a smaller one therebetween as a smaller motion vector; and a second multiplexer which is connected to the second comparator and the minimum generator in order to receive the smaller motion vector and a cover flag, wherein the cover flag is outputted when the second comparison signal is at the high voltage and conversely the smaller motion vector is outputted.

According to another feature of the invention, a temporal vector processing method for motion estimation is provided, which adjusts a temporal vector corresponding to a pixel of an image consisted of a 2D array of pixels. The method includes the steps of: (A) resetting a buffer where motion vectors of the pixels of the image are stored; (B) reading a first pixel from the image for a motion vector estimation to thereby generate a first motion vector; (C) performing a motion vector compensation on the first pixel according to the first motion vector to thereby generate a second pixel; (D) determining whether a corresponding storage location of the second pixel in the buffer stores a second motion vector; (E) directly storing the first motion vector in the buffer at the corresponding storage location of the second pixel when step (E) determines that the buffer does not store the second motion vector, and executing step (G); (F) updating the motion vector stored in the buffer at the corresponding storage location of the second pixel according to a determination mechanism; and (G) returning to step (B) for processing a next pixel succeeding the first pixel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
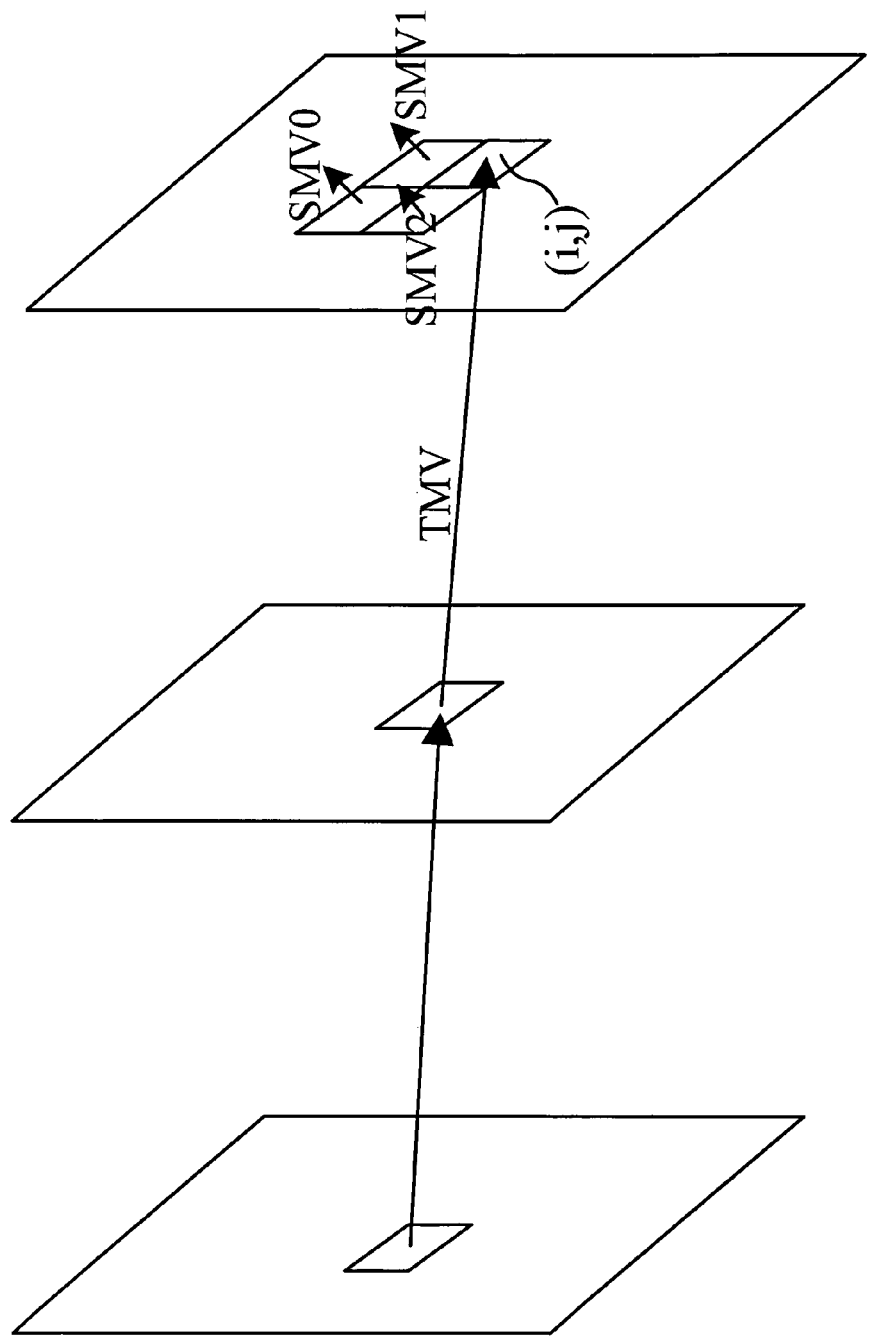
FIG. 1 is a schematic diagram of typically spatial and temporal motion vectors.
Figure 2:
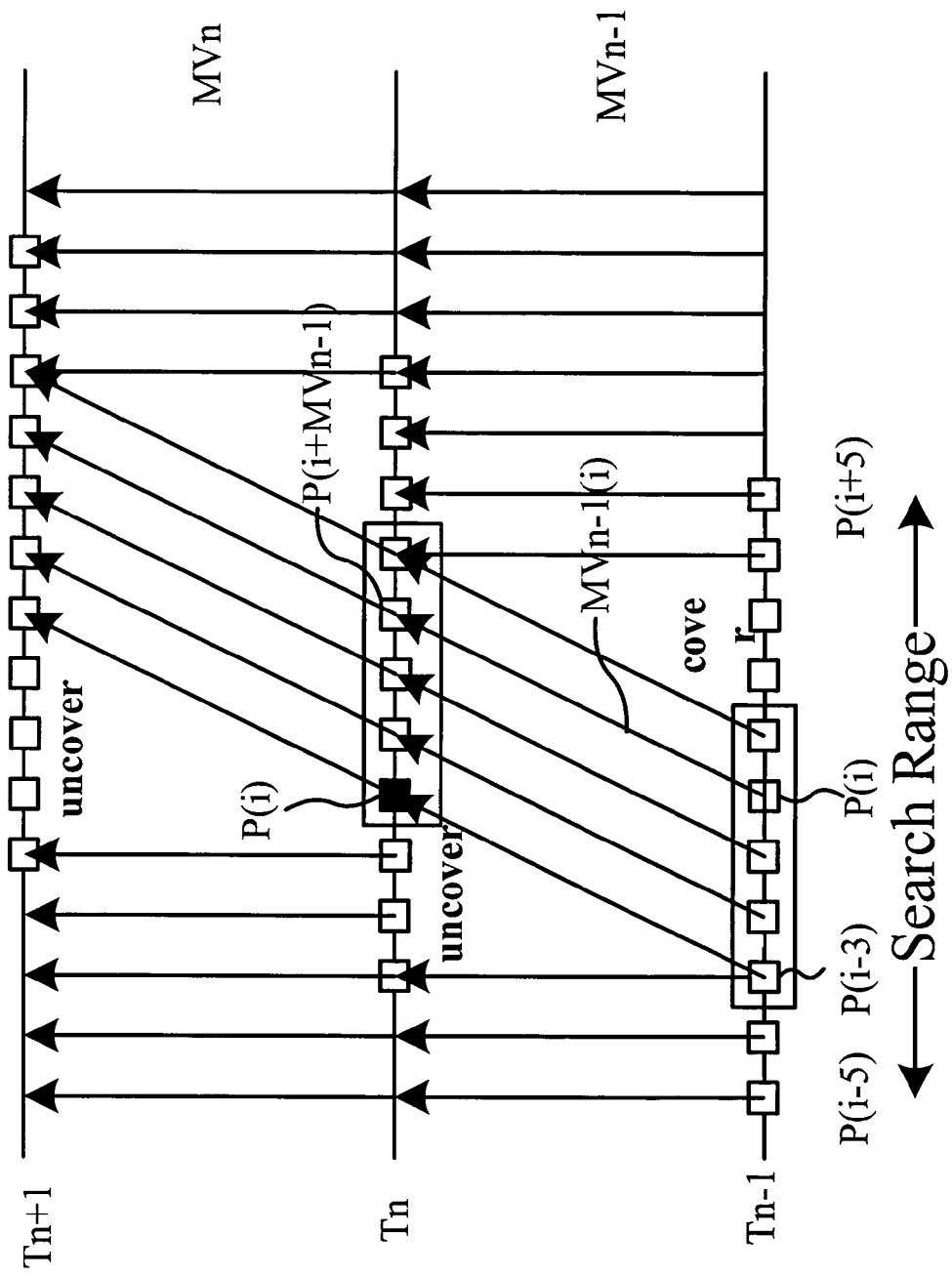
FIG. 2 is a schematic graph of a temporal motion vector generation in the prior art.
Figure 3:
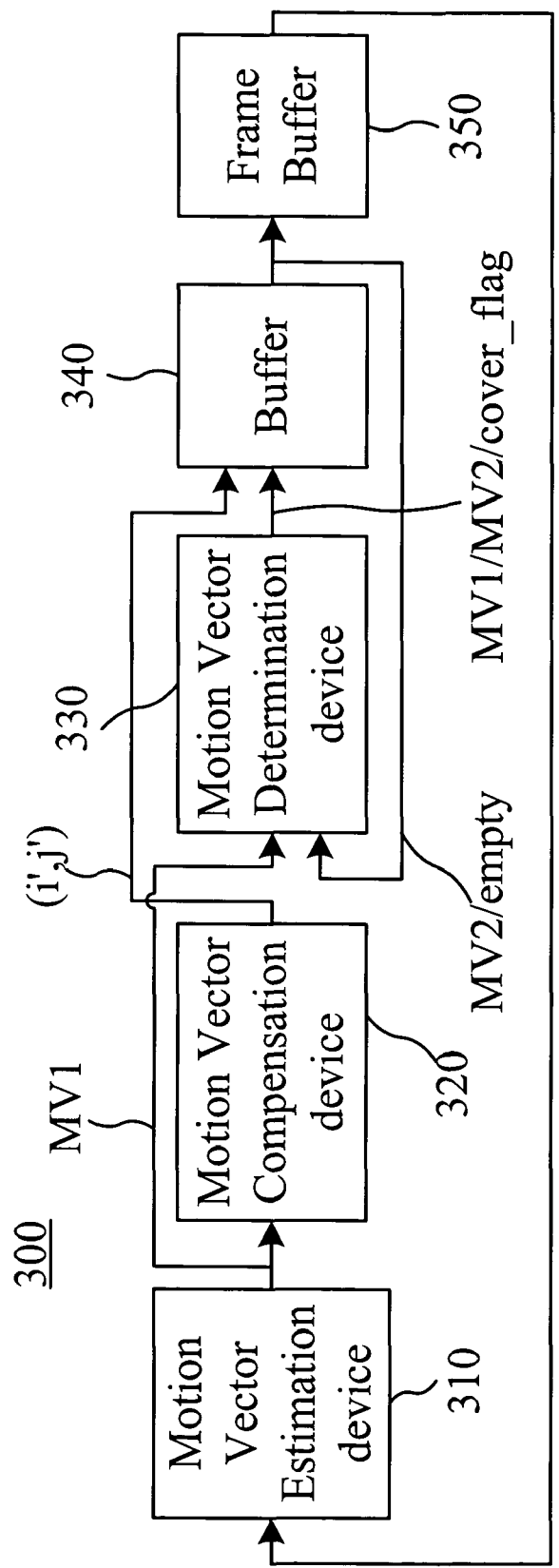
FIG. 3 is a block diagram of a temporal vector processing device for motion estimation according to an embodiment of the invention.

FIG. 3 is a block diagram of a temporal vector processing device 300 for motion estimation according to an embodiment of the invention. The processing device 300 can adjust temporal vectors. Each temporal vector corresponds to a pixel of an image. The image consists of a 2D array of pixels. In this embodiment, a pixel, which corresponds to a temporal vector, is given as an example for illustrative purpose only. Those skilled in the art can develop the pixel into a pixel block with the 2×2, 4×4, 6×6, 8×8 or 16×16 pixels. As shown in FIG. 3, the processing device 300 includes a motion vector estimation device 310, a motion vector compensation device 320, a buffer 340 and a motion vector determination device 330.

The motion vector estimation device 310 reads a first pixel (i, j) from the image for a motion estimation to thereby generate a first motion vector MV1.

The motion vector compensation device 320 is connected to the motion vector estimation device 310 in order to perform a motion vector compensation on the first pixel (i,j) based on the first motion vector MV1 to thereby generate a second pixel (i', j'). A corresponding storage location of the second pixel (i', j') is at the corresponding storage location of the desired motion vector. The motion vector compensation device 320 performs a displacement on the first pixel (i, j) to obtain a position of the second pixel (i', j'). A displacement quantity is equal to the first motion vector MV1.

The buffer 340 is connected to the motion vector compensation device 320 and the motion vector determination device 330 in order to store motion vectors of the pixels of the image. The buffer 340 is reset before a current image is performed with a motion estimation. In this embodiment, each storage unit of the buffer 340 is reset to be empty. In practice, each storage unit of the buffer 340 can be reset to a predetermined value. The motion vector determination device 330 is connected to the motion vector estimation device 310 and the motion vector compensation device 340 in order to determine whether the corresponding storage location of the second pixel (i', j') in the buffer 340 stores a second motion vector MV2 that is different from the first motion vector MV1. When it is determined that the second motion vector MV2 is stored in the buffer 340, the motion vector stored in the buffer 340 at the corresponding storage location of the second pixel (i', j') is updated based on a determination mechanism, and otherwise the first motion vector MV1 is directly stored in the buffer 340 at the corresponding storage location of the second pixel (i', j').

In this embodiment, the buffer 340 has a control unit which is based on the second pixel (i', j') provided by the motion vector compensation device 320 to output an information of the corresponding storage location of the second pixel (i', j') to the motion vector determination device 330. For those skilled in the art, the buffer 340 may have separate storage and control units or a combined storage and control unit. The corresponding storage location of the second pixel (i', j') is operated substantially through the control unit. Accordingly, the motion vector compensation device 320 and the buffer 340 are considered as a connection even the control unit of the buffer 340 is separately disposed in another device. For example, in an another embodiment, the control unit of the buffer 340 is disposed in the motion vector determination device 330, and in this case the motion vector determination device 330 is based on the second pixel (i', j') provided by the motion vector compensation device 320 to operate the information of the corresponding storage location of the second pixel (i', j') in the buffer 340.

Preferably, the processing device 300 further includes a frame buffer 350. The frame buffer 350 is connected to the buffer 340 and the motion vector estimation device 310 in order to temporarily store the motion vectors of the image. Specifically, when the motion vector on the corresponding storage location of the second pixel (i', j') is no more updated, the buffer 340 stores the motion vector on the corresponding storage location in the frame buffer 350. Namely, the frame buffer 350 stores the motion vector completely processed by the buffer 340.

The frame buffer 350 can further provide the stored motion vector to the motion vector estimation device 310 as a next-time temporal vector.

Figure 4:
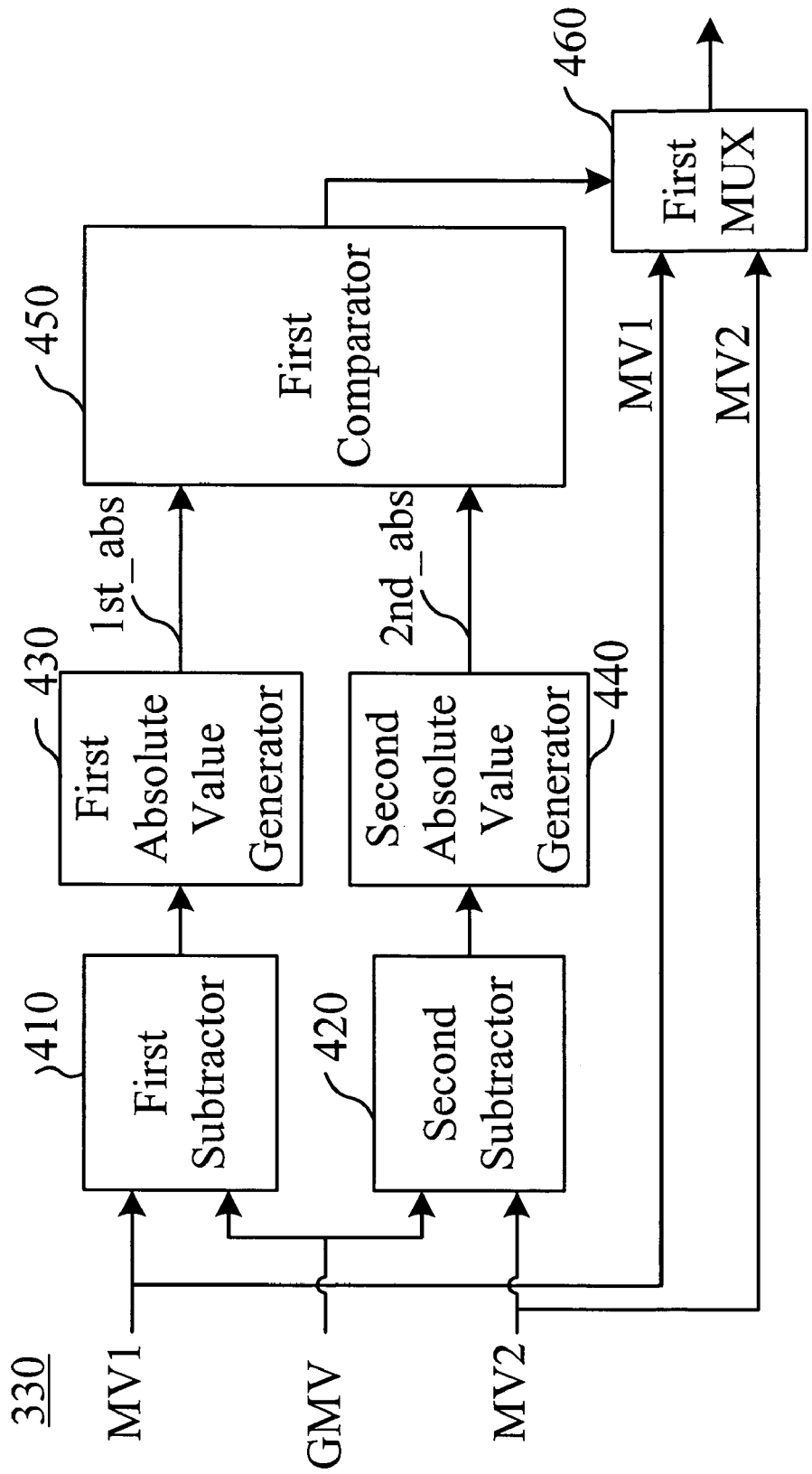
FIG. 4 is a block diagram of a motion vector determination device according to an embodiment of the invention.

FIG. 4 is a block diagram of a motion vector determination device 330 according to an embodiment of the invention. The motion vector determination device 330 includes a first subtractor 410, a second subtractor 420, a first absolute value generator 430, a second absolute value generator 440, a first comparator 450 and a first multiplexer 460.

The first subtractor 410 subtracts the first motion vector MV 1 from a global motion vector GMV to thereby generate a first difference. The second subtractor 420 subtracts the second motion vector MV2 from the global motion vector GMV to thereby generate a second difference.

The first absolute value generator 430 is connected to the first subtractor 410 in order to take an absolute operation on the first difference to thereby generate a first difference absolute value 1st_abs. The second absolute value generator 440 is connected to the second subtractor 420 in order to perform an absolute operation on the second difference to thereby generate a second difference absolute value 2nd_abs.

The first comparator 450 is connected to the first and the second absolute value generators 430 and 440 in order to generate a comparison signal. When the first difference absolute value 1st_abs is greater than the second difference absolute value 2nd_abs, the first comparison signal is generated at a high voltage, and otherwise the first comparison signal is generated at a low voltage.

The first multiplexer 460 is connected to the first comparator 450 in order to receive the first and the second motion vectors MV1 and MV2. When the comparator 450 generates the first comparison signal at the high voltage, the first motion vector MV1 is outputted. When the first comparison signal is at the low voltage, the second motion vector MV2 is outputted. The motion vector output is stored to the corresponding storage location of the second pixel (i', j').

The global motion vector GMV typically responds to a background motion vector. The invention essentially obtains a background motion vector. Accordingly, when the first comparison signal is at a high voltage, it indicates that the difference between the first motion vector MV1 and the global motion vector GMV is greater than the difference between the second motion vector MV2 and the global motion vector GMV. When the first comparison signal is at a low voltage, it indicates that the difference between the first motion vector MV1 and the global motion vector GMV is smaller than or equal to the difference between the second motion vector MV2 and the global motion vector GMV. Thus, the first multiplexer 460 outputs the second motion vector MV2.

The motion vector determination device 330 calculates the differences between the motion vector MV1 and the global motion vector GMV and between the motion vector MV2 and the global motion vector GMV respectively, and selects the motion vector with the greater difference to be the temporal vector. In general, when the background in a frame has a larger area, the global motion vector GMV has a higher opportunity to be equal to the background motion vector. As cited above, the two motion vectors are covered typically in crossing, and in this case it needs to separate the foreground from the background. The larger background area is typically used to select a motion vector with a greater difference from the global motion vector GMV. Thus, there is a higher opportunity that the foreground motion vector is not covered.

The motion vector determination device 330 outputs the last temporal vector as follows. If the corresponding storage location of the second pixel (i', j') is not updated (i.e., empty), an empty flag is outputted. Namely, this location corresponds to the uncover portion, and there is no reliable temporal vector. If the corresponding storage location of the second pixel (i', j') is updated once, the motion vector is outputted for detecting the uniform speed motion condition in a next time-point motion estimation. If the corresponding storage location of the second pixel (i', j') is updated twice and above, the finally updated motion vector is outputted. Such a motion vector is possibly a temporal vector or cover flag to indicate that the previously estimated position before the area belongs to the cover area and there is no reliable temporal vector. The motion estimation uses the temporal vector to select a candidate vector or adjust the penalties of the candidates.

Figure 5:
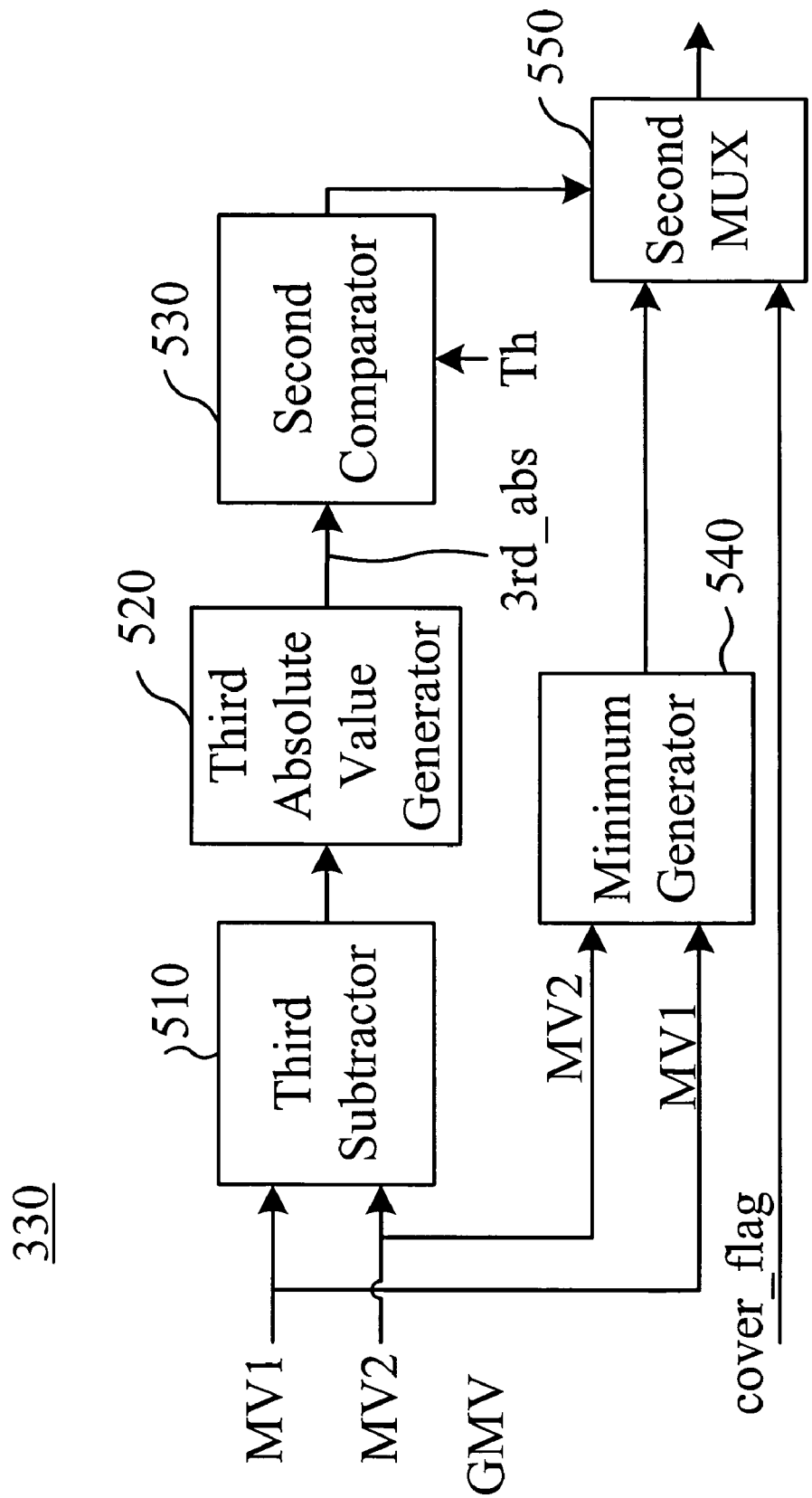
FIG. 5 is a block diagram of another motion vector determination device according to an embodiment of the invention.

FIG. 5 is a block diagram of another motion vector determination device 330 according to an embodiment of the invention. The motion vector determination device 330 includes a third subtractor 510, a third absolute value generator 520, a second comparator 530, a minimum generator 540 and a second multiplexer 550.

The third subtractor 510 subtracts the first motion vector MV1 from the second motion vector MV2 to thereby generate a third difference. The third absolute value generator 520 is connected to the third subtractor 510 in order to perform an absolute operation on the third difference to thereby generate a third difference absolute value 3rd_abs.

The second comparator 530 is connected to the third absolute value generator 520 in order to generate a second comparison signal at a low voltage when the third difference absolute value 3rd_abs is smaller than a threshold Th and generate the second comparison signal at a high voltage when the third difference absolute value 3rd_abs is greater than or equal to the threshold Th.

The minimum generator 540 receives the first and the second motion vectors MV1, MV2 and outputs a smaller one therebetween as a smaller motion vector.

The second multiplexer 550 is connected to the second comparator 530 and the minimum generator 540 in order to receive the smaller motion vector and a cover flag cover_flag. When the second comparison signal is at the high voltage, the cover flag is outputted. When the second comparison signal is at the low voltage, the smaller motion vector is outputted.

When the second comparison signal is at the high voltage, representing that the difference between the first and the second motion vectors MV1, MV2 is greater than or equal to the threshold Th, is indicates, with very high possibility, that one of the first and the second motion vectors MV1, MV2 is a foreground motion vector while the other is a background motion vector. In this case, the found foreground motion vector is not very accurate, and the second multiplexer 550 outputs the cover flag cover_flag.

When the second comparison signal is at the low voltage, representing that the difference between the first and the second motion vectors MV1, MV2 is smaller than the threshold Th, it indicates, with very high possibility, that the first and the second motion vectors MV1, MV2 are all foreground motion vectors or all background motion vectors. In this case, the second multiplexer 550 outputs the first or second motion vector MV1 or MV2 that is smaller.

The second motion vector MV2 indicates a temporal vector which is previously stored and is not an empty flag. The first motion vector MV1 indicates a motion vector obtained in the current motion estimation. The difference between the two vectors is calculated and performed with an absolute operation to thereby obtain the distance between the two vectors. The distance is compared with a threshold Th. When the distance is greater than the threshold Th, the temporal vector is set to be a cover flag in order to indicate that the position is covered and a single temporal vector can cause an error on the temporal estimation. Accordingly, the flag can block the action of selecting the temporal vector in the motion estimation or change the penalties of the temporal vector candidates. When the distance is smaller than the threshold Th, the smaller vector is selected to generate a steady motion vector field.

The motion vector determination device 330 outputs the last temporal vector as follows. If the corresponding storage location of the second pixel (i', j') is not updated (i.e., empty), an empty flag is outputted. Namely, this position corresponds to the uncover portion, and there is no reliable temporal vector. If the corresponding storage location of the second pixel (i', j') is updated once, the motion vector is outputted for detecting the uniform speed motion condition in a next time-point motion estimation. If the corresponding storage location of the second pixel (i', j') is updated twice and above, the possible temporal vector or the cover flag cover_flag is outputted.

Figure 6:
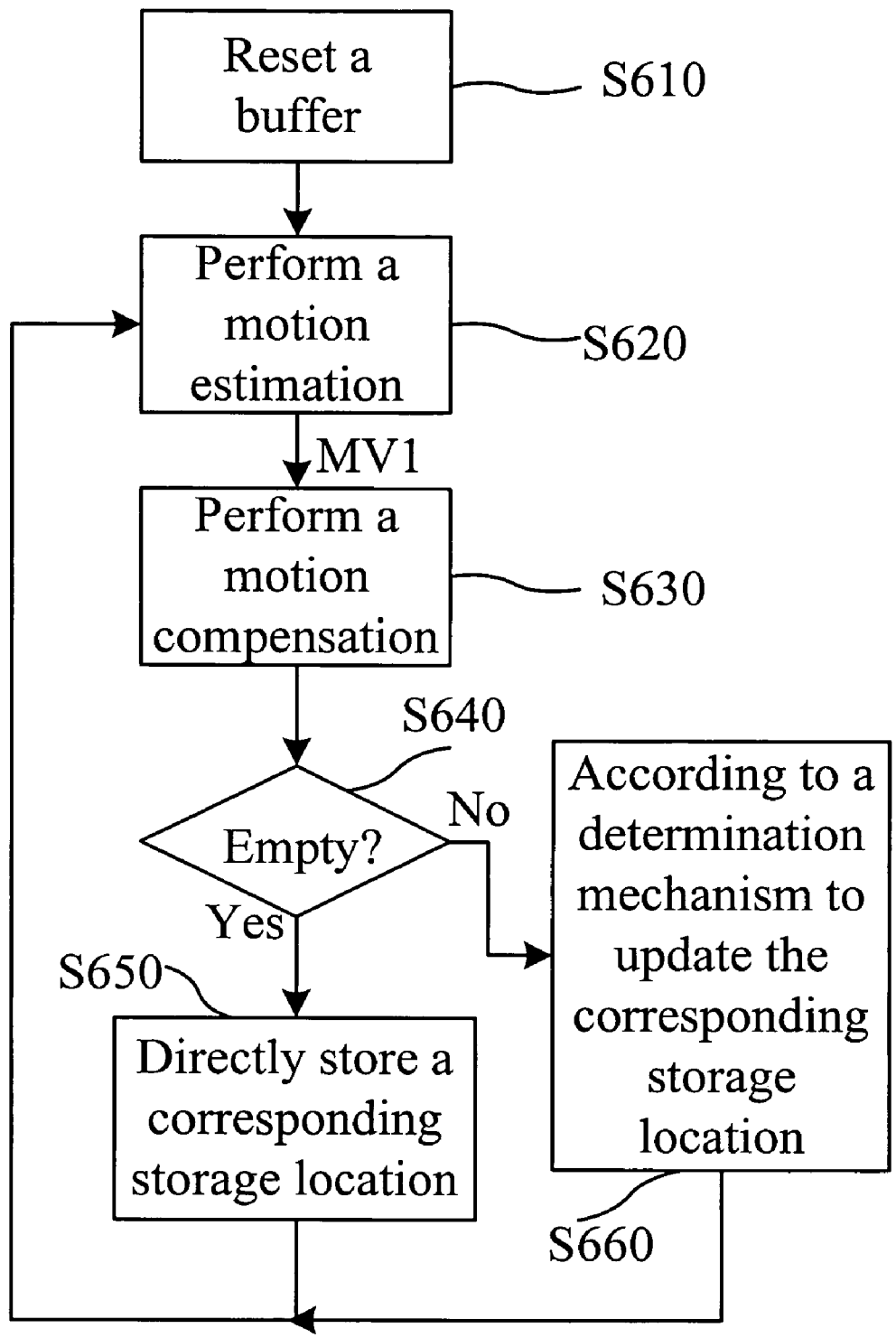
FIG. 6 is a flowchart of a temporal vector processing method for motion estimation according to an embodiment of the invention.

FIG. 6 is a flowchart of a temporal vector processing method for motion estimation according to an embodiment of the invention. The method can adjust temporal vectors. Each temporal vector corresponds to a pixel of an image. The image consists of a 2D array of pixels. As shown in FIG. 6, step S610 resets the buffer 340 which stores motion vectors of the pixels of the image. For example, each storage unit of the buffer 340 is reset to be empty.

In step S620, the motion vector estimation device 310 reads a first pixel (i, j) of the image from the frame buffer 350 and performs a motion estimation on the first pixel (i, j) to thereby generate a first motion vector MV1.

In step S630, the motion vector compensation device 320 is based on the first motion vector MV1 to perform a motion vector compensation on the first pixel (i, j) to thereby obtain a second pixel (i', j'). The motion vector compensation device 320 performs a displacement on the first pixel (i, j) to thereby obtain a position of the second pixel (i', j'). A displacement quantity is equal to the first motion vector MV 1.

Step S640 determines whether a corresponding storage location of the second pixel (i', j') in the buffer 340 stores a second motion vector MV2 different from the first motion vector MV1. Namely, it determines whether the corresponding storage location of the second pixel (i', j') is empty or not.

When step S640 determines that the second motion vector MV2 is not stored in the buffer 340, step S650 directly stores the first motion vector MV1 in the buffer 340 at the corresponding storage location of the second pixel (i', j'), and the process returns to step S620 for processing a next pixel succeeding the first pixel.

When step S640 determines that the second motion vector MV2 is stored in the buffer 340, step S660 is based on a determination mechanism to update the corresponding storage location of the second pixel (i', j') in the buffer, and the process returns to step S620 for processing a next pixel succeeding the first pixel.

Figure 7:
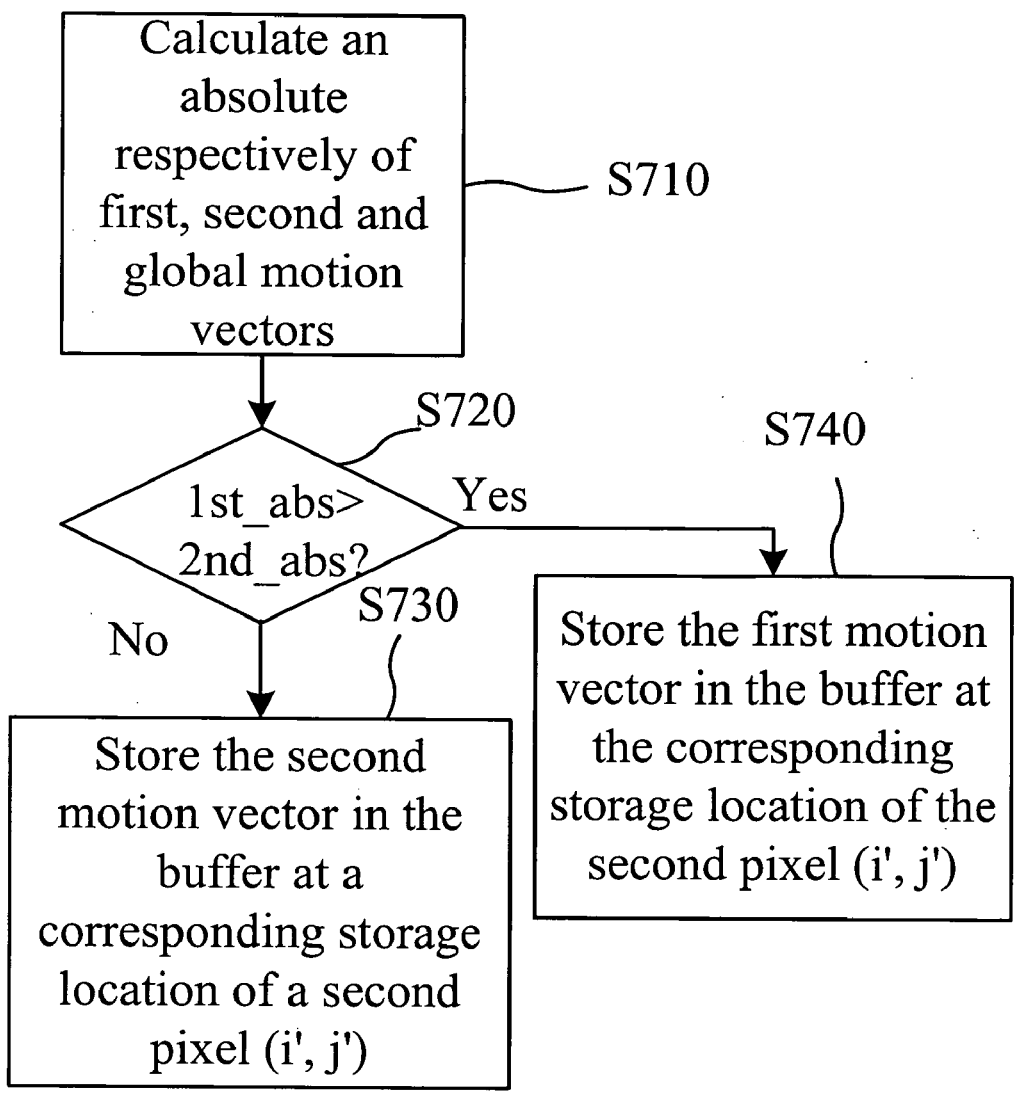
FIG. 7 is a flowchart of a determination mechanism according to an embodiment of the invention.

FIG. 7 is a flowchart of the determination mechanism of FIG. 6 according to an embodiment of the invention. As shown in FIG. 7, step S710 calculates an absolute value of a difference between the first motion vector MV1 and a global motion vector GMV to thereby generate a first difference absolute value 1st_abs. Step S710 also calculates an absolute value of a difference between the second motion vector MV2 and the global motion vector GMV to thereby generate a second difference absolute value 2nd_abs.

Step S720 determines whether the first difference absolute value 1st_abs is greater than the second difference absolute value 2nd_abs. When the first difference absolute value 1st_abs is smaller than or equal to the second difference absolute value 2nd_abs, step S730 stores the second motion vector MV2 in the buffer at the corresponding storage location of the second pixel (i', j'). When the first difference absolute value 1st_abs is greater than the second difference absolute value 2nd_abs, step S740 stores the first motion vector MV1 in the buffer at the corresponding storage location of the second pixel (i', j').

Figure 8:
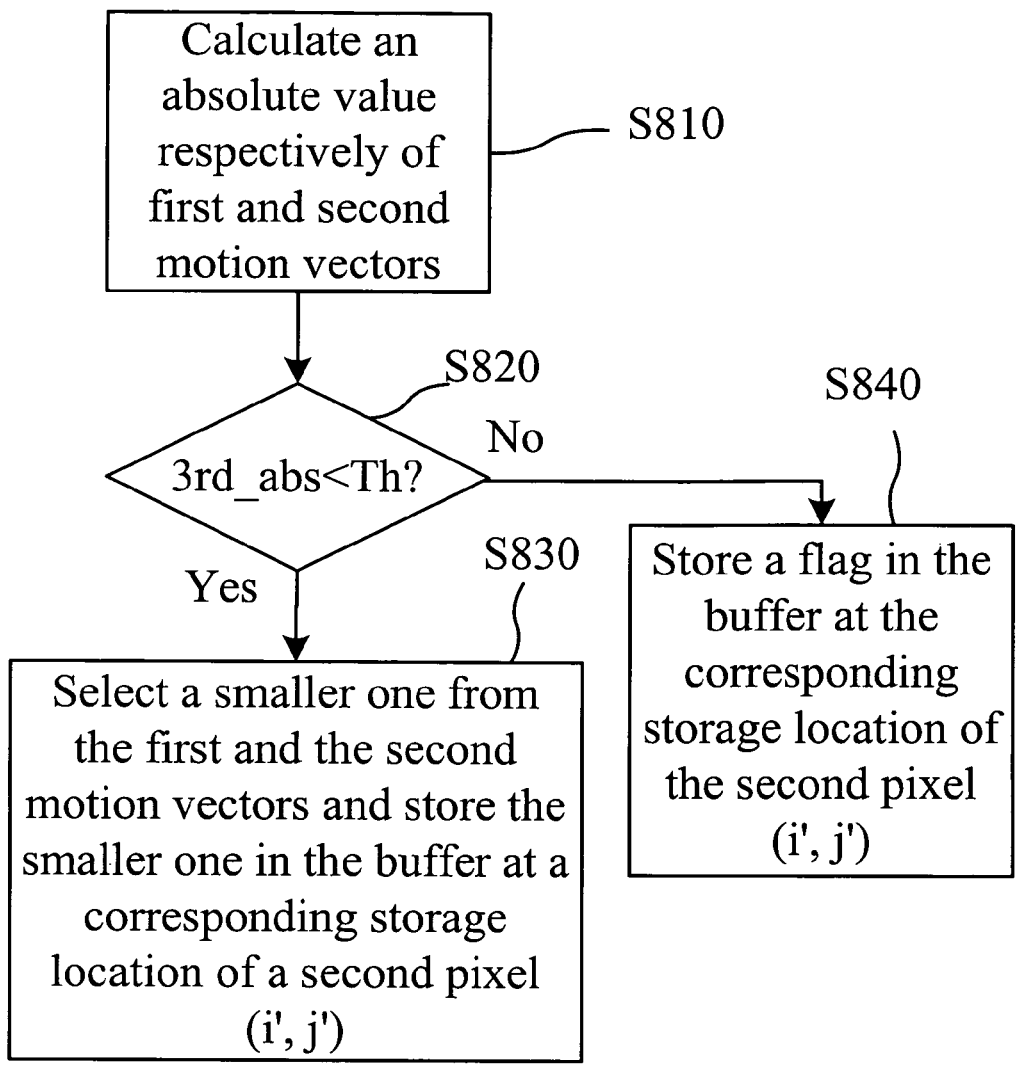
FIG. 8 is a flowchart of another determination mechanism according to an embodiment of the invention.

FIG. 8 is a flowchart of another determination mechanism according to an embodiment of the invention. As shown in FIG. 8, step S810 calculates an absolute value of a difference between the first motion vector MV1 and the second motion vector MV2 to thereby generate a third difference absolute value 3rd_abs.

Step S820 determines whether the third difference absolute value 3rd_abs is smaller than a threshold Th.

When the third difference absolute value 3rd_abs is smaller than the threshold Th, step S830 selects a smaller one from the first motion vector MV1 and the second motion vector MV2 and stores the smaller one in the buffer at the corresponding storage location of the second pixel (i', j').

When the third difference absolute value 3rd_abs is greater than or equal to the threshold Th, step S840 stores a cover flag cover_flag in the buffer at the corresponding storage location of the second pixel (i', j').

Figure 9:
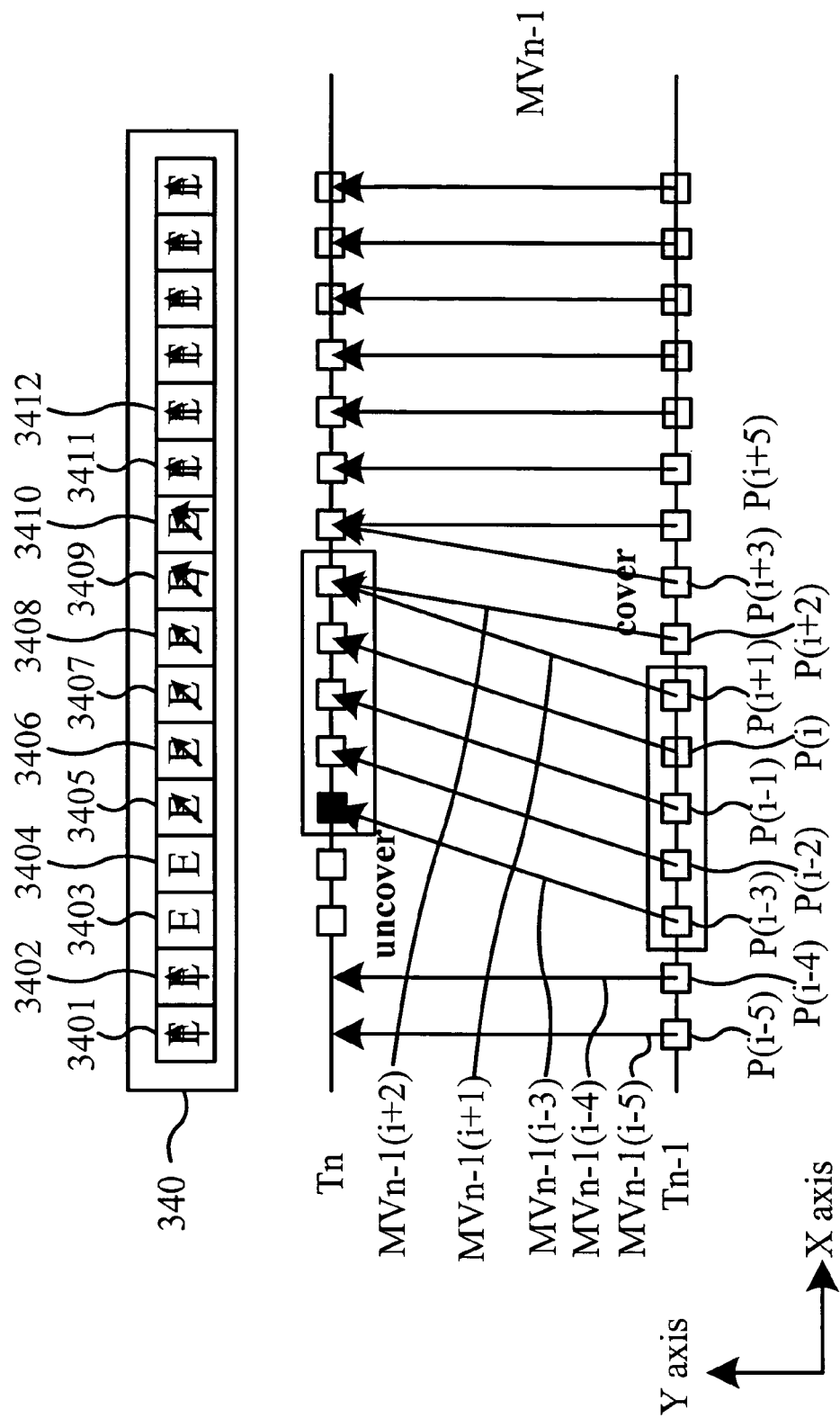
FIG. 9 a schematic graph of a temporal vector storage in motion estimation according to an embodiment of the invention.

FIG. 9 a schematic graph of a temporal vector storage in motion estimation according to an embodiment of the invention. For convenience of description, only an example of 1D motion vector displacement in FIG. 9 is given. Namely, the motion vector compensation device 320 in step S630 performs only an X-axis displacement on the first pixel (i, j). A 2D motion vector displacement is known to those skilled in the art, and thus a detailed description is deemed unnecessary.

As shown in FIGS. 6 and 9, step S610 resets each storage unit 3401, 3402, 3403, . . . of the buffer 340 to be empty.

In step S620, the motion vector estimation device 310 reads a first pixel (i, j) of the image from the frame buffer 350 and performs a motion estimation on the first pixel (i, j) to thereby generate a first motion vector MV1. Namely, a pixel P(i−5) of the image is read and performed with a motion estimation to thereby generate a motion vector MVn−1(i−5).

In step S630, the motion vector compensation device 320 performs a displacement on the first pixel (i, j) to thereby obtain a position of the second pixel (i', j'). A displacement quantity is equal to the first motion vector MV1. Namely, the motion vector compensation device 320 performs the displacement on the pixel P(i−5). Since the X-axis part of the motion vector MVn−1(i−5) is zero, the position of the second pixel (i', j') after the displacement is at the position of the pixel P(i−5).

Step S640 determines whether the corresponding storage location of the second pixel (i', j') is empty. Namely, step S640 determines whether the storage unit 3401 of the pixel P(i−5) is empty (E).

When the storage unit 3401 is empty (E), step S650 directly stores the motion vector MVn−1(i−5) in the buffer at the corresponding storage unit 3401 of the second pixel (i', j'), and the process returns to step S620 for processing a next pixel P(i−4) to the first pixel (i, j). The next pixel P(i−4) is operated similar to the pixel P(i−5), so there is no more description.

For processing the pixel P(i−3), in step S630, the motion vector compensation device 320 performs a displacement on the first pixel (i, j) to thereby obtain a position of the second pixel (i', j'). Namely, the motion vector compensation device 320 performs the displacement on the pixel P(i−3). Since the X-axis part of the motion vector MVn−1(i−3) indicates two pixels, the position of the second pixel (i', j') after the displacement is at the position of the pixel P(i−1).

Since the storage unit 3405 is empty (E), step S650 directly stores the motion vector MVn−1(i−3) in the buffer at the corresponding storage unit 3405 of the second pixel (i', j'), and the procedure returns to step S620 for processing a next pixel P(i−2) to the first pixel (i, j). The following pixels P(i−2), P(i−1), P(i), P(i+1) are operated respectively similar to the pixel P(i−3), so there is no more description.

For processing the pixel P(i+2), in step S630, the motion vector compensation device 320 performs a displacement on the first pixel (i, j) to thereby obtain a position of the second pixel (i', j'). Namely, the motion vector compensation device 320 performs the displacement on the pixel P(i+2). Since the X-axis part of the motion vector MVn−1(i+2) indicates one pixel, the position of the second pixel (i', j') after the displacement is at the position of the pixel P(i+3).

Step S640 determines whether the corresponding storage location of the second pixel P(i+3) is empty (E). Namely, step S640 determines whether the storage unit 3409 of the pixel P(i+3) is empty (E) or not.

Since the storage unit 3409 is filled with the motion vector MVn−1(i+1), step S640 determines that the motion vector MVn−1(i+1) is stored in the storage unit 3409 of the buffer 340. Accordingly, step S660 is based on the determination mechanism to update the storage unit 3409 of the buffer 340, and the process returns to step S620 for processing a next pixel P(i+3) to the first pixel P(i+2).

As cited, the invention sets the corresponding storage location of the temporal vector to be empty (E) before a motion estimation is performed, and generates the motion vector MVn−1 of the pixel at the current position after the motion estimation is performed, thereby performing a motion vector compensation by means of the motion vector and calculating the compensated motion vector position. When the storage location of the temporal vector corresponding to the compensated motion vector position contains an empty flag, the storage location of the temporal vector is updated to contain the motion vector of the motion estimation. When the storage location of the temporal vector corresponding to the compensated motion vector position does not contain an empty flag, the motion vector determination device compares the original temporal vector with the newly calculated motion vector to generate the last temporal vector.

The invention uses the empty flag setting, the motion vector compensation, the empty flag check and the non-empty motion vector processing to detect cover and uncover states during a temporal candidate vector processing and uses the detected cover and uncover states to adjust the temporal vector, such that the motion vector estimation device can find an accurate motion vector more rapidly and precisely.

Although the present invention has been explained in relation to its preferred embodiment, it is to be understood that many other possible modifications and variations can be made without departing from the spirit and scope of the invention as hereinafter claimed.

What is claimed is:

1. A temporal vector processing device for motion estimation, which adjusts a temporal vector corresponding to a pixel of an image consisting of a 2D array of pixels, the temporal vector processing device comprising:

a motion vector estimation device for performing a motion estimation on a first pixel read from the image to generate a first motion vector;

a motion vector compensation device connected to the motion vector estimation device for performing a motion vector compensation on the first pixel based on the first motion vector to generate a second pixel;

a buffer connected to the motion vector compensation device for storing motion vectors of the pixels of the image; and a motion vector determination device connected to the motion vector estimation device and the buffer for determining whether a corresponding storage location of the second pixel in the buffer stores a second motion vector, wherein the second motion vector stored in the buffer at the corresponding storage location of the second pixel is updated according to a determination mechanism when it is determined that the second motion vector is stored in the buffer, otherwise the first motion vector is directly stored in the buffer at the corresponding storage location of the second pixel;

wherein the motion vector determination device comprises:

a first subtractor for subtracting the first motion vector from a global motion vector to generate a first difference;

a second subtractor for subtracting the second motion vector from the global motion vector to generate a second difference;

a first absolute value generator connected to the first subtractor for performing an absolute operation on the first difference to generate a first difference absolute value;

a second absolute value generator connected to the second subtractor for performing an absolute operation on the second difference to generate a second difference absolute value;

a first comparator connected to the first and the second absolute value generators for generating a first comparison signal; and a first multiplexer connected to the first comparator for receiving the first and the second motion vectors, wherein the first motion vector is outputted when the first comparison signal is at a high voltage and conversely the second motion vector is outputted.

2. The temporal vector processing device as claimed in claim 1, further comprising a frame buffer connected to the buffer for temporarily storing the motion vectors in the buffer and store the motion vectors after the motion vectors corresponding to the storage location of the second pixel in the buffer are no more updated.

3. The temporal vector processing device as claimed in claim 2, wherein the motion vector compensation device performs a displacement on the first pixel to generate the second pixel, where a displacement quantity is equal to the first motion vector.

4. A temporal vector processing device for motion estimation, which adjusts a temporal vector corresponding to a pixel of an image consisting of a 2D array of pixels, the temporal vector processing device comprising:
- a motion vector estimation device for performing a motion estimation on a first pixel read from the image to generate a first motion vector;
- a motion vector compensation device connected to the motion vector estimation device for performing a motion vector compensation on the first pixel based on the first motion vector to generate a second pixel;
- a buffer connected to the motion vector compensation device for storing motion vectors of the pixels of the image; and
- a motion vector determination device connected to the motion vector estimation device and the buffer for determining whether a corresponding storage location of the second pixel in the buffer stores a second motion vector, wherein the second motion vector stored in the buffer at the corresponding storage location of the second pixel is updated according to a determination mechanism when it is determined that the second motion vector is stored in the buffer, otherwise the first motion vector is directly stored in the buffer at the corresponding storage location of the second pixel;

wherein the motion vector determination device comprises:
- a third subtractor for subtracting the first motion vector from the second motion vector to generate a third difference;
- a third absolute value generator connected to the third subtractor for performing an absolute operation on the third difference to generate a third difference absolute value;
- a second comparator connected to the third absolute value generator for generating a second comparison signal at a low voltage when the third difference absolute value is smaller than a threshold and generating the second comparison signal at a high voltage when the third difference absolute value is greater than or equal to the threshold;
- a minimum generator for receiving the first and the second motion vectors and outputting a smaller one therebetween as a smaller motion vector; and a second multiplexer connected to the second comparator and the minimum generator for receiving the smaller motion vector and a cover flag, wherein the cover flag is outputted when the second comparison signal is at the high voltage and conversely the smaller motion vector is outputted.

\* \* \* \* \*